United States Patent [19]

Ronning

[11] 4,279,556
[45] Jul. 21, 1981

[54] AUGER AIRLOCK ASSEMBLY HAVING PRODUCT CUTTING KNIFE

[75] Inventor: Richard L. Ronning, Overland Park, Kans.

[73] Assignee: Ronning Engineering Company, Inc., Overland Park, Kans.

[21] Appl. No.: 111,233

[22] Filed: Jan. 11, 1980

[51] Int. Cl.³ .............................................. B65G 53/48
[52] U.S. Cl. ...................................... 414/218; 406/53
[58] Field of Search .................. 414/218; 406/53, 54, 406/55, 56, 57, 58, 59, 60, 61, 169; 198/670, 671

[56] References Cited

U.S. PATENT DOCUMENTS

| | | | |
|---|---|---|---|
| 1,254,393 | 1/1918 | Clendon | 406/61 |
| 2,127,693 | 8/1938 | McCanless et al. | 406/61 |
| 2,186,404 | 1/1940 | Carter | 406/56 X |
| 2,566,419 | 9/1951 | Kane | 198/671 X |
| 2,681,737 | 6/1954 | Simenson et al. | 414/218 |
| 3,756,434 | 9/1973 | Teske | 414/218 |
| 3,841,465 | 10/1974 | Miller et al. | 414/218 X |

Primary Examiner—James L. Rowland
Attorney, Agent, or Firm—Schmidt, Johnson, Hovey & Williams

[57] ABSTRACT

An improved auger airlock is disclosed which includes a blade for preventing blockage or buildup of material conveyed through the airlock. An axially rotatable auger blade is disposed within the elongated auger tube and has a central shaft extending to the outlet end of the tube. An elongated blade is secured to the end of the shaft, transversely of the longitudinal axis thereof, for rotation with the shaft. The blade is operable for cutting up agglomerated material at the outlet end to prevent clogging. A hingeably mounted door is attached to the outlet of the tube and is biased to the closed position by an adjustable counterweight operably attached to the door.

5 Claims, 4 Drawing Figures

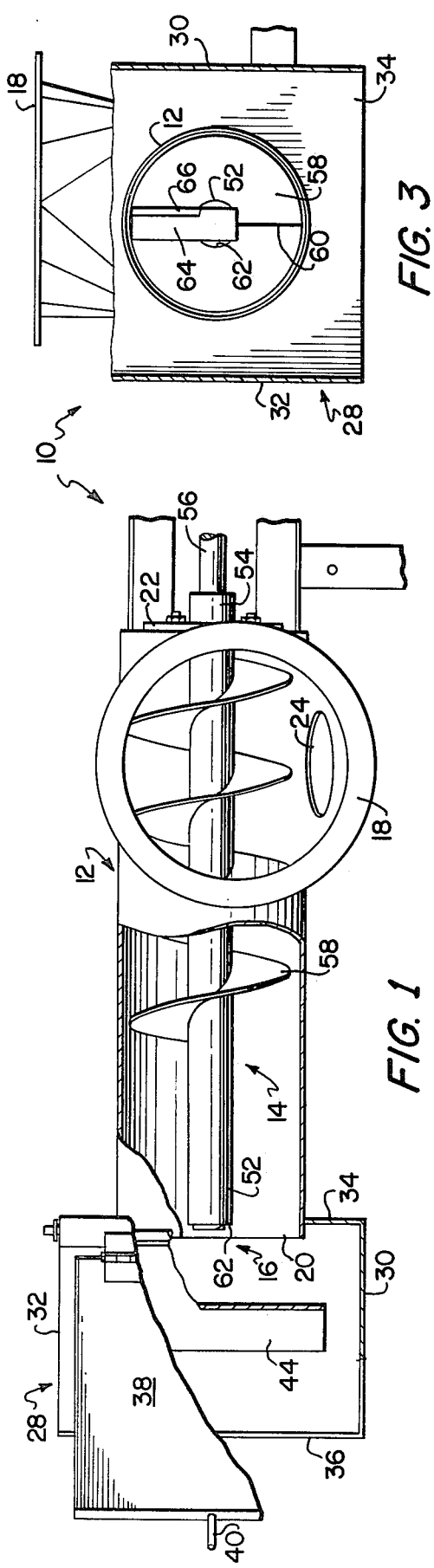
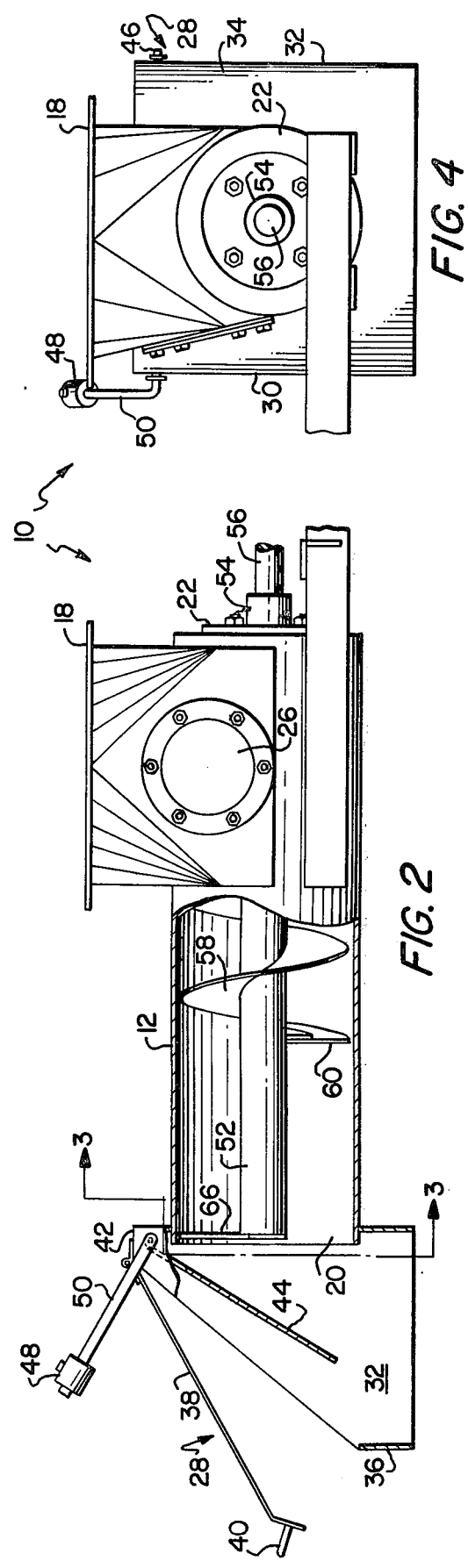

AUGER AIRLOCK ASSEMBLY HAVING PRODUCT CUTTING KNIFE

BACKGROUND OF THE INVENTION

1. Field of the Invention

The present invention is directed to an auger airlock assembly for conveying agricultural material along a desired path, for example from the outlet of a cyclone separator to a collection hopper. More specifically, the invention relates to an improved auger airlock assembly provided with an auger-mounted, rotatable blade at the outlet of the unit for cutting and dispersing buildups of material at this point, so as to minimize material jams.

2. Description of the Prior Art

An auger airlock is often used for conveying materials such as agricultural products (e.g., alfalfa) along a desired path of travel in a negative pressure system. Such an airlock is generally necessary to preserve the integrity of the overall negative pressure system. Generally speaking, prior auger airlocks include an elongated barrel or tube presenting a material inlet and a material outlet spaced from the inlet, with an elongated, axially rotatable, material-conveying auger screw positioned within the tube. In negative pressure situations, appropriate airlock doors and the like are provided for maintaining the reduced pressure conditions throughout the system.

The use of auger airlocks is not new in the industry. However, two related problems have arisen in conventional auger airlocks, particularly when handling coarse materials. The first is that materials may fall from the outlet in large lumps rather than in the more desirable smaller pieces. The second problem stems from the possibility of the system stalling if the coarse material agglomerates at the outlet of the auger tube. When this occurs, it is often necessary to shut down the airlock apparatus and manually clear the blockage. It will also be appreciated that both of these problems can impair the negative pressure conditions within the overall system. Hence, there is a real need for an improved auger airlock for breaking up agglomerations and blockages of coarse material, to thereby assure smooth, trouble-free operation.

SUMMARY OF THE INVENTION

The present invention largely solves the above problems through use of a shiftable cutting knife disposed at the outlet end of the airlock chamber, where the most serious blockages normally occur. The knife unit allows the auger airlock assembly to easily handle coarse materials without frequent breakdowns or material jam-ups.

More particularly, the auger airlock of the invention includes an elongated barrel or tube having an inlet and an outlet at opposite ends thereof. A helical auger blade is located inside of the airlock tube and secured to a central, axially rotatable shaft extending virtually the entire length of the tube. The auger blade extends from the tube inlet to a point spaced from the outlet. A product cutting blade is secured to the end of the central shaft nearest the outlet.

In particularly preferred forms, the shaft-mounted product cutting blade is oriented in a manner to best facilitate the dispersal of material from the outlet end of the auger tube. Specifically, the auger blade presents a terminal edge closest to the tube outlet which extends radially outwardly from the shaft towards the auger tube wall. In like manner, the elongated blade extends radially relative to the auger shaft, but in a direction generally opposite to that of the auger terminal edge. This opposed relationship is important inasmuch as material is thereby allowed to pass through the tube without encountering resistance because of the presence of the blade. That is to say, material passing through an auger tube tends to collect in the lower regions of the tube. Further, when the terminal edge of the auger blade is in this lower tube region, forces tending to move the material along the tube towards the outlet are at a maximum. Therefore, it is desirable to arrange the auger terminal edge and cutting blade out of radial alignment so that when the auger imparts maximum force to the collected material, the cutting blade does not obstruct material flow.

BRIEF DESCRIPTION OF THE DRAWING

FIG. 1 is a top view in partial section and with parts broken away for clarity of the preferred auger airlock of the invention;

FIG. 2 is a side view in partial section and with parts broken away of the airlock;

FIG. 3 is a sectional view of the apparatus taken along line 3—3 of FIG. 2; and

FIG. 4 is an end elevational view of the auger airlock.

DESCRIPTION OF THE PREFERRED EMBODIMENT

Turning now to the drawing, an auger airlock assembly 10 in accordance with the invention broadly includes an elongated material conveying tube or barrel 12, an elongated, axially rotatable material conveying auger 14 situated within barrel 12, and means broadly referred to by the numeral 16 shiftably supported within assembly 10 for preventing undue buildup and blockage of material within tube 12.

Elongated auger tube 12 is of conventional construction and presents an elongated, horizontally extending tubular region along with an upstanding, flanged material inlet 18 and a material outlet 20 spaced from the inlet. The end of tube 12 remote from outlet 20 is covered by a plate 22 and a secondary access port 24 is provided adjacent inlet 18 and is normally covered by a removable transparent plate 26 (see FIG. 2).

Collection box structure referred to by the numeral 28 is operatively disposed adjacent outlet end 20 of tube 12. The structure 28 has an open bottom and includes a pair of spaced, somewhat triangularly shaped sidewalls 30, 32, an apertured front plate 34 receiving the extreme end of tube 12 adjacent outlet 20, a rear wall 36 spaced from wall 34, and an access door 38. The door 38 is equipped with a handle 40, and is hingedly secured to a top plate 42 secured to the upper margin of plate 34 and sidewalls 30, 32.

An airlock door 44 is disposed within box structure 28 and is pivotally mounted on a shaft 46 extending between the walls 30, 32. The door 44 is dimensioned to cover outlet opening 20 of tube 12, and is biased to its outlet-closing position in covering relationship to outlet 20 by means of an adjustable counterweight 48. The latter is secured to shaft 46 by means of an extension 50 (see FIGS. 2 and 4).

Auger 14 includes an elongated central shaft 52 which extends substantially along the longitudinal axis of tube 12. The shaft 52 is supported for axial rotation by means of a conventional bearing assembly 54 secured to plate 22. A drive shaft 56 is operatively coupled to the shaft 52 and is in turn connected to motive means (not shown) for rotation of shaft 52.

A continuous, helically formed auger blade 58 is secured to shaft 56 and extends along the length thereof from the region of inlet 18 toward outlet 20. It will be observed in this respect that the auger blade 58 terminates in a substantially radially extending terminal edge 60 which is spaced a significant distance from the end 62 of shaft 52 adjacent outlet 20.

The blockage preventing means 16 is in the form of an elongated blade 64 presenting an elongated cutting edge 66. The blade 64 is mounted on the butt end 62 of shaft 52 and extends radially therefrom to a point close to the surrounding auger tube 12. Referring specifically to FIG. 3, it will be seen that the terminal edge 60 of auger blade 58, and blade 64, extend in substantially opposite radial directions from the central shaft 52.

Although not specifically illustrated in the drawing, it is to be understood that assembly 10 is designed for incorporation into an overall material handling system, such as that found in an alfalfa dehydration plant. Typically, a cyclone separator or the like is operatively connected to flanged material inlet 18, and a material collection bin is disposed below collection box structure 28. In this manner the assembly 10 serves to convey separated alfalfa or the like received from the outlet of the cyclone separator to the collection bin.

During the operation of assembly 10 in such an illustrative environment, material is fed through the inlet 18 into barrel 12 while auger 14 rotates. The material is thus conveyed in the well known fashion along the length of tube 12 for ultimate discharge into and through collection box structure 28. The biased airlock door 44 remains closed except when material is forced therethrough, as will be readily understood.

As the auger shaft 52 rotates, blade 66 secured thereto likewise rotates. Thus, during each revolution of the shaft 52 the blade 66 serves to cut through any material collected at outlet 20, thereby precluding agglomeration or buildup of material therein.

As noted above, material conveyed through tube 12 characteristically will collect by gravity in the lowermost portions of tube 12. Furthermore, when the terminal edge 60 of auger blade 58 rotates to this lower portion of the tube 12, maximum translational forces are imparted to the material. In order to ensure efficiency of operation, it is desirable that no undue restriction to material movement be imposed, particularly at the time when maximum forces of movement are being transmitted. Therefore, in the preferred forms of the present invention, the blade 66 is oriented so as to be in the upper regions of tube 12 when edge 60 of blade 58 is in the lower regions thereof. Most advantageously, the blade and terminal auger edge extend substantially in opposite radial directions relative to one another. With this construction, maximum breakup of collected materials at outlet 20 is achieved coupled with smooth, trouble free movement of the materials out of outlet 20.

Having thus described the invention, what is claimed as new and desired to be secured by Letters Patent is:

1. An auger airlock, comprising:
   an elongated material-conveying tube having an inlet, and an outlet spaced from the inlet;
   an elongated, axially rotatable shaft within said tube, oriented generally along the longitudinal axis of the tube, and extending to a point adjacent said outlet;
   a helical auger blade disposed about and secured to said shaft within said tube and presenting an end edge proximal to said outlet which extends generally radially from said shaft toward said tube in a first direction; and
   shiftable means adjacent said outlet for preventing blockage of said tube by said material including an elongated blade secured to the end of said shaft adjacent said outlet, the longitudinal axis of said blockage-preventing blade extending radially outwardly from said shaft in a second direction different from said first direction,
   said shaft, auger blade end edge, blockage-preventing blade and tube being cooperatively configured and arranged such that, when said end edge is in the lower portion of said tube for imparting maximum translation forces to said material, said lower portion of the tube is free of substantial material flow restrictions between said auger end edge and said outlet.

2. The auger airlock as recited in claim 1, including a shiftable airlock door adjacent said outlet, there being means for biasing said door in the closed position.

3. The auger airlock as recited in claim 2, wherein said biasing means includes an adjustable counterweight operably connected to said door.

4. The auger airlock as recited in claim 1, said blockage-preventing means being in the form of only a single elongated blade secured to said shaft.

5. The auger airlock as recited in claim 1, said first and second directions being generally opposite one another.

* * * * *